(12) United States Patent
Okajima et al.

(10) Patent No.: US 9,970,507 B2
(45) Date of Patent: May 15, 2018

(54) ANTI-VIBRATION APPARATUS AND METHOD OF MANUFACTURING ANTI-VIBRATION APPARATUS

(71) Applicant: BRIDGESTONE CORPORATION, Chuo-ku, Tokyo (JP)

(72) Inventors: Yoshichika Okajima, Tokyo (JP); Tatsuya Tsutsumi, Tokyo (JP); Hidehisa Ito, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days. days.

(21) Appl. No.: 15/122,442

(22) PCT Filed: Dec. 16, 2014

(86) PCT No.: PCT/JP2014/083303
§ 371 (c)(1),
(2) Date: Aug. 30, 2016

(87) PCT Pub. No.: WO2015/133038
PCT Pub. Date: Sep. 11, 2015

(65) Prior Publication Data
US 2017/0074348 A1 Mar. 16, 2017

(30) Foreign Application Priority Data
Mar. 7, 2014 (JP) .................. 2014-045414

(51) Int. Cl.
*F16F 1/38* (2006.01)
*F16F 15/08* (2006.01)
(Continued)

(52) U.S. Cl.
CPC ............... *F16F 15/08* (2013.01); *F16F 1/36* (2013.01); *F16F 1/3849* (2013.01); *F16M 13/02* (2013.01);
(Continued)

(58) Field of Classification Search
CPC ...... F16F 15/08; F16F 1/36; F16F 1/38; F16F 1/3863; F16F 1/3849; F16F 2224/025; F16F 2226/045; F16M 13/02; Y10T 29/49611
(Continued)

(56) References Cited

U.S. PATENT DOCUMENTS 5,435,516 A * 7/1995 Ogasawara ........... F16F 1/3849
248/635
9,476,479 B2 * 10/2016 Nakamura ............ F16F 1/3842
(Continued)

FOREIGN PATENT DOCUMENTS

EP 1491790 A1 12/2004
FR 2 808 854 A1 11/2001
(Continued)

OTHER PUBLICATIONS

Communication dated Feb. 3, 2017, issued from the European Patent Office in counterpart Application No. 14884673.6.
(Continued)

*Primary Examiner* — Nkeisha Smith
(74) *Attorney, Agent, or Firm* — Sughrue Mion, PLLC

(57) ABSTRACT

An anti-vibration apparatus (10) has a bracket (12) that is mounted at a vehicle body (26) (i.e., one of a vibration-generating portion or a vibration-receiving portion), a mounting portion (14) that is mounted at an engine (24) (i.e. the other one of the vibration-generating portion or the vibration-receiving portion), an elastic body (16) that is provided at the mounting portion (14) and is press-inserted into the bracket (12), and that is interposed between the bracket (12) and the mounting portion (14), an auxiliary elastic portion (18) that is provided at the mounting portion (14), and extends in a press-insertion direction of the elastic body (16), a threaded component (52) (i.e., the connector portion (20)) that is provided at the auxiliary elastic portion (18), and a connection-receiving portion (22) that is pro-
(Continued)

vided at the bracket (12), and to which the connector portion (20) is connected.

4 Claims, 7 Drawing Sheets

(51) Int. Cl.
*F16F 1/36* (2006.01)
*F16M 13/02* (2006.01)

(52) U.S. Cl.
CPC ... *F16F 2224/025* (2013.01); *F16F 2226/045* (2013.01)

(58) Field of Classification Search
USPC ............... 248/634, 638; 267/140.12, 140.13
See application file for complete search history.

(56) References Cited

U.S. PATENT DOCUMENTS

| | | | |
|---|---|---|---|
| 9,551,396 B2* | 1/2017 | Yoshii | F16F 1/371 |
| 9,562,587 B2* | 2/2017 | Pichel | F16F 1/3849 |
| 2003/0030200 A1* | 2/2003 | Akamatsu | F16F 1/3732 |
| | | | 267/140.13 |
| 2005/0217918 A1* | 10/2005 | Endo | F16F 1/3863 |
| | | | 180/291 |
| 2008/0164114 A1* | 7/2008 | Kawashima | F16F 1/3849 |
| | | | 188/379 |
| 2015/0240908 A1* | 8/2015 | Pizanti | F16M 13/02 |
| | | | 248/634 |

FOREIGN PATENT DOCUMENTS

| | | |
|---|---|---|
| GB | 2417542 A | 3/2006 |
| JP | 55-49133 U | 3/1980 |
| JP | 2011-214634 A | 10/2011 |
| JP | 2012-116242 A | 6/2012 |
| JP | 2013-119879 A | 6/2013 |

OTHER PUBLICATIONS

International Search Report of PCT/JP2014/083303, dated Feb. 10, 2015. [PCT/ISA/210].

* cited by examiner

US 9,970,507 B2

ANTI-VIBRATION APPARATUS AND METHOD OF MANUFACTURING ANTI-VIBRATION APPARATUS

CROSS REFERENCE TO RELATED APPLICATIONS

This application is a National Stage of International Application No. PCT/JP2014/083303, filed Dec. 16, 2014, claiming priority based on Japanese Patent Application No. 2014-045414, filed Mar. 7, 2014, the contents of all of which are incorporated herein by reference in their entirety.

TECHNICAL FIELD

The present invention relates to an anti-vibration apparatus that is ideal for use in a vehicle, and to a method of manufacturing an anti-vibration apparatus.

BACKGROUND ART

In Japanese Patent Application Laid-Open (JP-A) No. 2011-214634 there is disclosed an anti-vibration apparatus that has a bracket that is mounted onto one of a vibration-generating portion or a vibration-receiving portion, and a mounting portion that is mounted onto the other one of the vibration-generating portion or the vibration-receiving portion, and to which an elastic body is joined, and in which the elastic body is non-adhesively mounted onto the inner side of the bracket.

SUMMARY OF THE INVENTION

Technical Problem

The aforementioned bracket has a cylindrical portion in which a bound stopper portion, a side stopper portion, a rebound stopper portion, and an engaging recessed portion are integrally formed, and the elastic body is press-inserted into the cylindrical portion in an axial direction thereof. In this structure, a load in the radial direction of the cylindrical portion is received over a broad area of the cylindrical portion, while a load in the axial direction of the cylindrical portion (i.e., in the direction in which the elastic body is press-inserted) is received by leg portions of the elastic body being caught in the engaging recessed portion.

The present invention was conceived in view of the above-described circumstances, and it is an object thereof to increase the load capacity in the elastic body press-insertion direction in an anti-vibration apparatus in which an elastic body is mounted non-adhesively on a bracket.

Solution to the Problem

An anti-vibration apparatus according to a first aspect is provided with a bracket that is mounted at one of a vibration-generating portion or a vibration-receiving portion, a mounting portion that is mounted at the other one of the vibration-generating portion or the vibration-receiving portion, an elastic body that is provided at the mounting portion and is press-inserted into the bracket, and that is interposed between the bracket and the mounting portion, an auxiliary elastic portion that is provided at the mounting portion, and that extends in a press-insertion direction of the elastic body, a connector portion that is provided at a distal end on the front side in the press-insertion direction of the auxiliary elastic portion, and a connection-receiving portion that is provided at the bracket, and to which the connector portion is connected.

In this anti-vibration apparatus, the auxiliary elastic portion that extends in the press-insertion direction of the elastic body is provided at the mounting portion, and the connector portion at the distal end of the auxiliary elastic portion is connected to the connection-receiving portion of a bracket. Accordingly, in this anti-vibration apparatus in which the elastic body is mounted onto the bracket without adhesive, it is possible to increase the load capacity in the press-insertion direction of the elastic body.

A second aspect is characterized in that, in the anti-vibration apparatus according to the first aspect, a recessed portion that opens towards the front side in the press-insertion direction is disposed at the mounting portion, and the auxiliary elastic portion is disposed inside the recessed portion.

In this anti-vibration apparatus, because the auxiliary elastic portion is disposed inside the recessed portion in the mounting portion, it is possible to suppress any increase in the size of the anti-vibration apparatus that might otherwise result from the auxiliary elastic portion being provided, and the space utilization efficiency in the portion where the anti-vibration apparatus is mounted can be increased.

A third aspect is characterized in that, in the anti-vibration apparatus according to the second aspect, the auxiliary elastic portion is separated from internal wall surfaces of the recessed portion.

In this anti-vibration apparatus, because the auxiliary elastic portion is separated from the internal wall surfaces of the recessed portion, it is difficult for the auxiliary elastic portion to come into contact with the internal wall surfaces of the recessed portion when the vibration-generating portion is generating vibration. Because of this, the auxiliary elastic portion is able to maintain its spring characteristics in the directions in which the auxiliary elastic portion moves towards or away from the internal wall surface of the recessed portion.

A fourth aspect is characterized in that, in the anti-vibration apparatus according to any one of the first through third aspects, in accordance with a static load received from the vibration-generating portion when the anti-vibration apparatus is being mounted onto the vibration-generating portion and the vibration-receiving portion, distortion is imparted to the auxiliary elastic portion in an opposite direction from a direction in which the static load is acting, and an axial direction of the auxiliary elastic portion is inclined relative to the press-insertion direction.

In this anti-vibration apparatus, in accordance with the static load received from the vibration-generating portion when the anti-vibration apparatus is being mounted onto the vibration-generating portion and the vibration-receiving portion, distortion is imparted in the opposite direction from the direction in which the static load is acting. Accordingly, in a state in which the anti-vibration apparatus is being mounted onto the vibration-generating portion and the vibration-receiving portion, the distortion imparted to the auxiliary elastic portion decreases, so that the inclination of the auxiliary elastic portion also decreases. Because of this, when the anti-vibration apparatus is being mounted onto the vibration-generating portion and the vibration-receiving portion, the auxiliary elastic body can be brought close to a neutral state.

A method of manufacturing an anti-vibration apparatus according to a fifth aspect includes press-inserting, into a bracket, an elastic body that is provided at a mounting portion and is interposed between the bracket, which is mounted at one of a vibration-generating portion or a vibration-receiving portion, and the mounting portion, which is mounted at the other one of the vibration-generating portion or the vibration-receiving portion, applying a static load so as to act on the elastic body, and placing the elastic body in a state in which the elastic body is deformed in a direction in which the static load is acting, connecting an auxiliary elastic portion, which is provided at the mounting portion and extends in a press-insertion direction of the elastic body, to a connection-receiving portion that is provided at the bracket, via a connector portion that is provided on the auxiliary elastic portion, and by removing the static load, inclining the auxiliary elastic portion relative to the press-insertion direction, and imparting distortion to the auxiliary elastic portion in an opposite direction from the direction in which the static load is acting.

According to this method of manufacturing an anti-vibration apparatus, it is easy to manufacture an anti-vibration apparatus in which an auxiliary elastic portion can be brought closer to a neutral state when the anti-vibration apparatus is being mounted onto a vibration-generating apparatus and a vibration-receiving apparatus.

Advantageous Effects of the Invention

According to the anti-vibration apparatus of the present invention, the superior effect is achieved that it is possible to increase the load capacity in the elastic body press-insertion direction in an anti-vibration apparatus in which an elastic body is mounted non-adhesively on a bracket.

DESCRIPTION OF THE EMBODIMENTS

Figure 1:
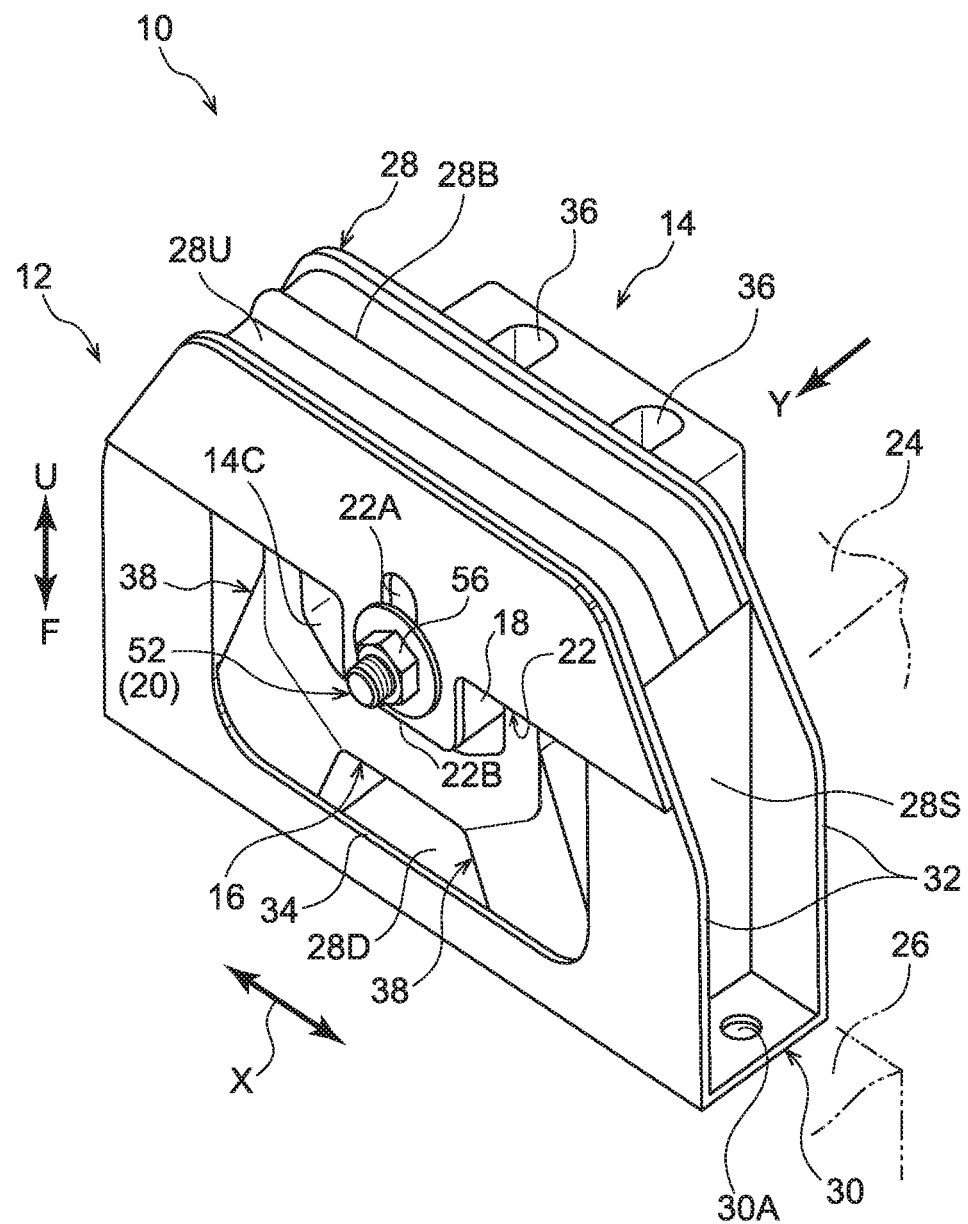
FIG. 1 is a perspective view showing an anti-vibration apparatus.
Figure 2:
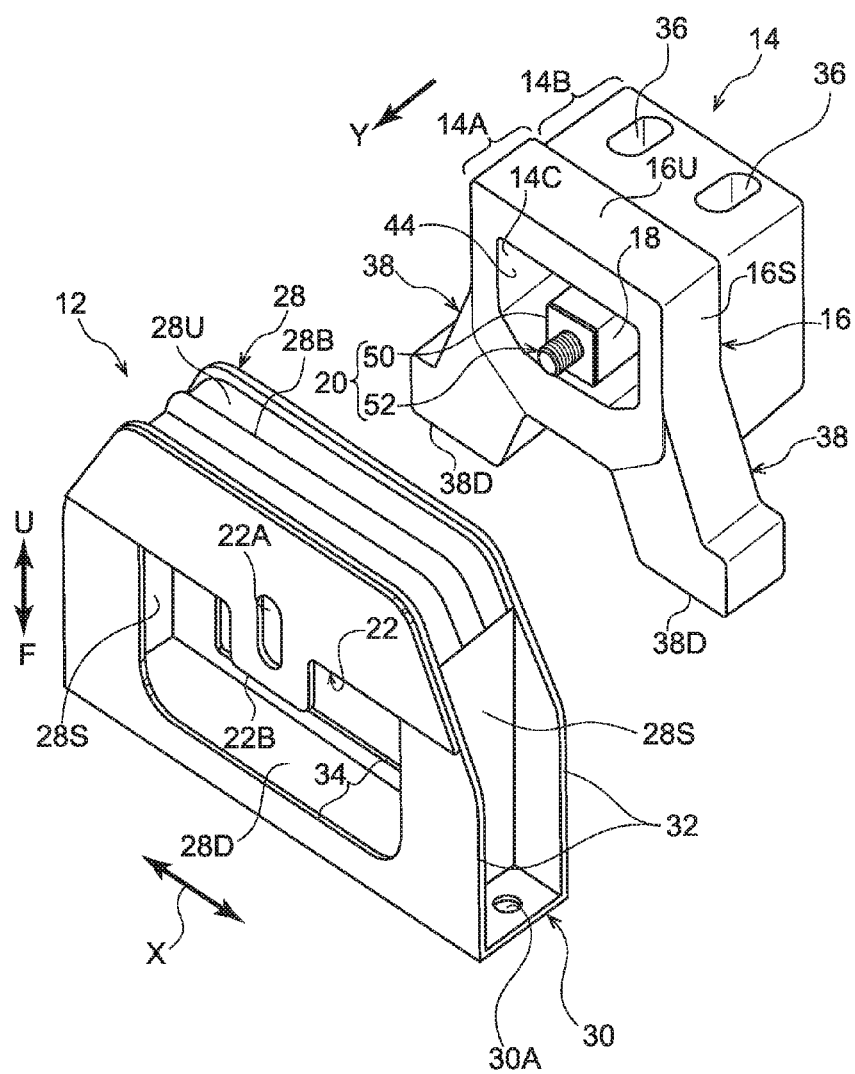
FIG. 2 is an exploded perspective view showing an anti-vibration apparatus.
Figure 3:
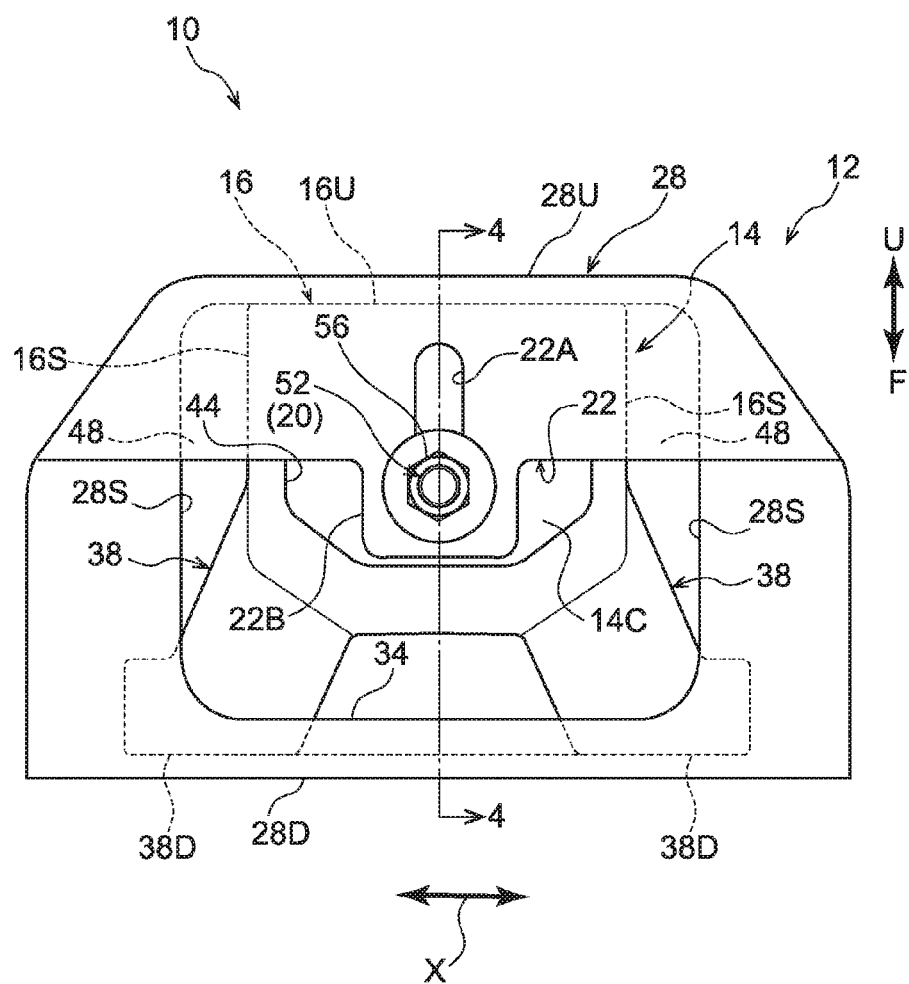
FIG. 3 is a front view showing an anti-vibration apparatus.

Hereinafter, embodiments for implementing the present invention will be described based on the drawings. In FIG. 1 through FIG. 3, an anti-vibration apparatus 10 according to the present embodiment is an engine mount for a vehicle that is used to mount an engine 24, which is serving as an example of a vibration-generating portion, onto a vehicle body 26, which serves as an example of a vibration-receiving portion. This anti-vibration apparatus has a bracket 12, a mounting portion 14, an elastic body 16, an auxiliary elastic portion 18, a connector portion 20, and a connection-receiving portion 22.

The bracket 12 is a metal component that is mounted onto one of the engine 24 or the vehicle body 26, for example, onto the vehicle body 26. This bracket 12 has a square-shaped cylindrical portion 28. Both sides in the axial direction of the cylindrical portion 28 are open. This axial direction is the same as the direction in which the elastic body 16 is press-inserted (i.e., the direction shown by the arrow Y). A reinforcing bead 28B that protrudes outwards is formed running in the circumferential direction of the cylindrical portion 28. A flange 30 is formed in a bottom portion 28D of the cylindrical portion 28 so as to overhang on the outer side (i.e., in the direction shown by an arrow X in FIG. 1 and FIG. 2) of this cylindrical portion 28. A mounting hole 30A that is used for mounting the bracket 12 onto the vehicle body 26 is formed in the flange 30. Ribs 32 are provided respectively on both ends in the axial direction of side portions 28S of the cylindrical portion 28, and these ribs 32 join the side portions 28S to the flange 30.

Stoppers 34 are provided respectively on both end portions in a press-insertion direction (i.e., in the direction shown by the arrow Y) of the bottom portion 28D of the cylindrical portion 28. The stoppers 34 cause the aperture of the cylindrical portion 28 to become narrower in the locations of leg portions 38 of the elastic body 16 (described below). When the leg portions 38 are pressed against the stoppers 34, the stoppers 34 generate a reaction force towards the leg portions 38. Namely, a certain amount of springiness in the axial direction of the cylindrical portion 28 is secured in the elastic body 16 by the stoppers 34.

Figure 4:
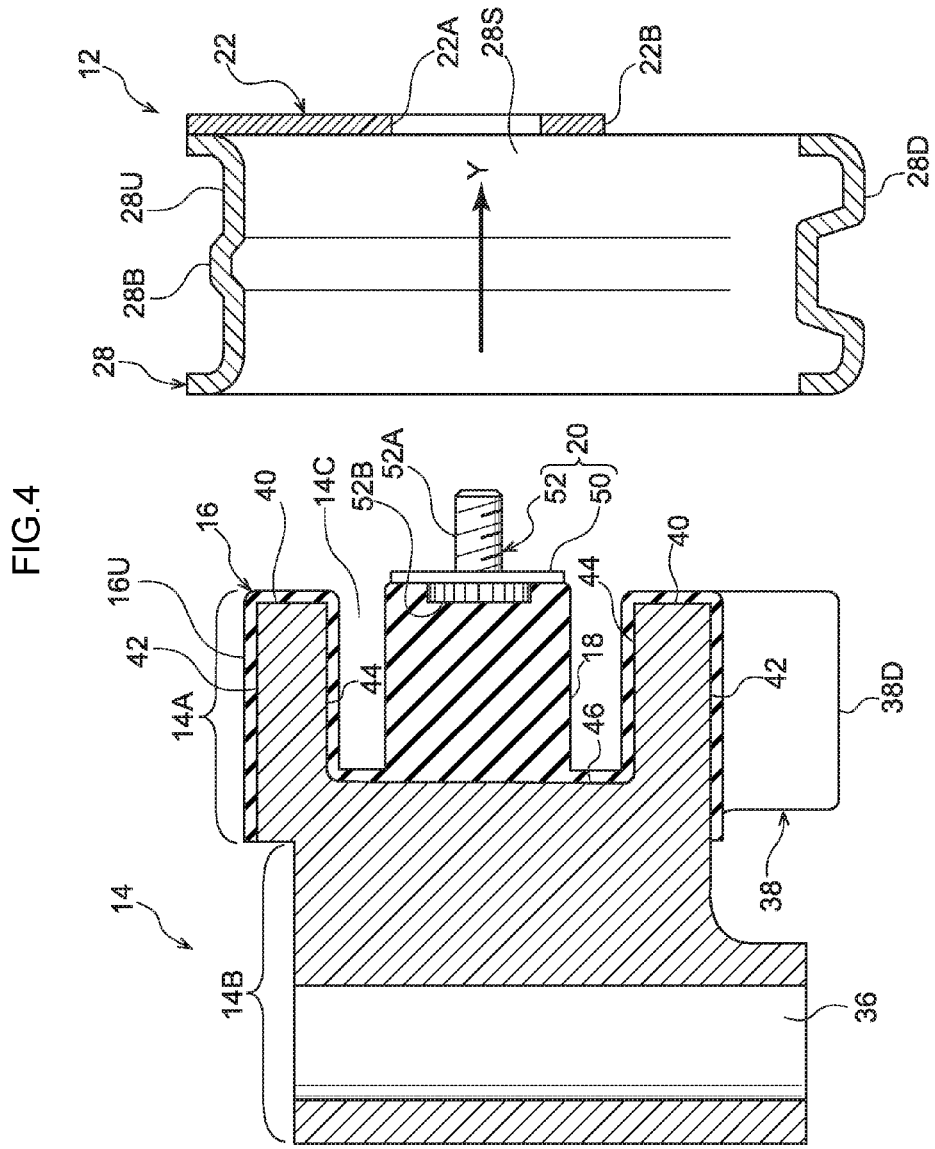
FIG. 4 is a cross-sectional view corresponding to a line 4-4 shown in FIG. 3 showing a state in which an elastic body provided at a mounting portion is press-inserted into a cylindrical portion of a bracket.

In FIG. 1, the mounting portion 14 is a metal component that is mounted onto the other one of the engine 24 or the vehicle body 26, for example, onto the engine 24. As is shown in FIG. 2 and FIG. 4, a plurality of through holes 36, for example, are formed in a rear portion 14B of the mounting portion 14. The through holes 36 are holes through which fastening components (not shown in the drawings) that are used to mount the mounting portion 14 onto the engine 24 are inserted. The rear portion 14B of the mounting portion 14 is positioned on the rearward side in the press-insertion direction (i.e., in the direction shown by the arrow Y), specifically, on the outer side of the cylindrical portion 28.

Figure 7:
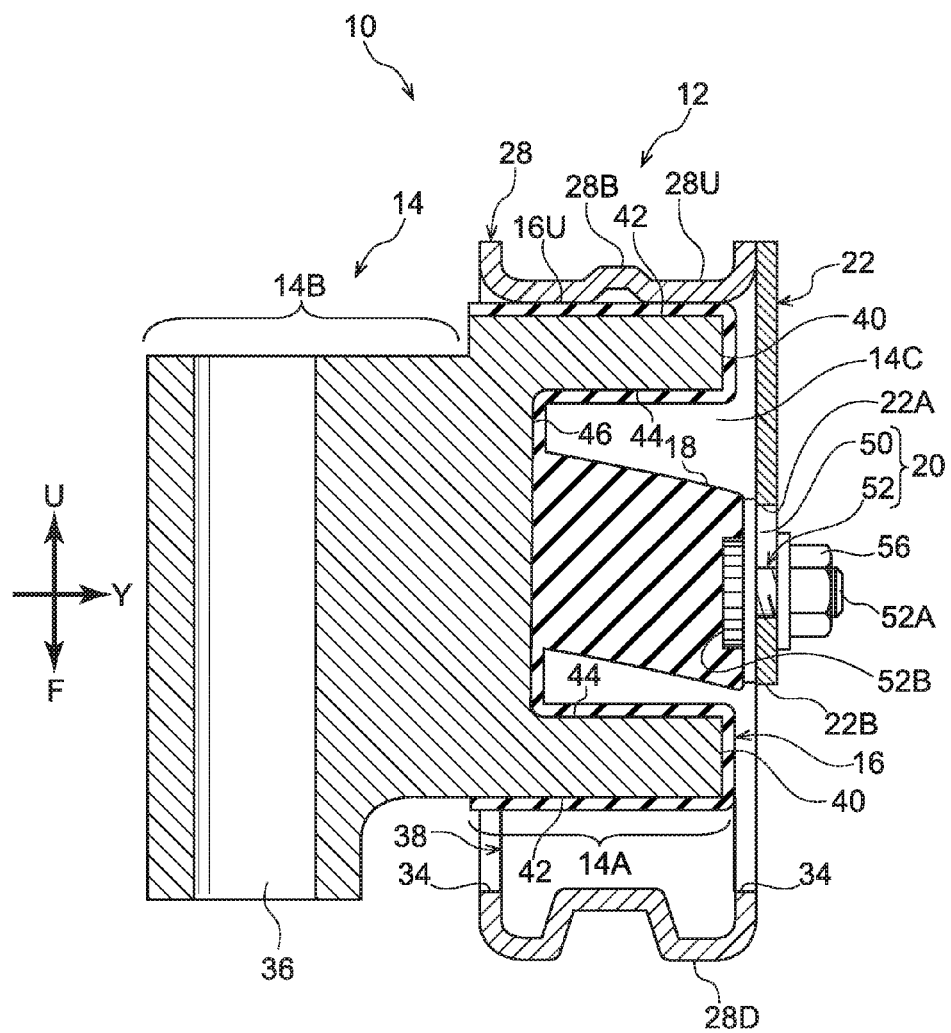
FIG. 7 is a cross-sectional view showing an anti-vibration apparatus in which a connector portion is connected to a connection-receiving portion.

As is shown in FIG. 7, a front portion 14A of the mounting portion 14 that is located on the forward side in the press-insertion direction (i.e., in the direction shown by the arrow Y) is placed on the inner side of the cylindrical portion 28 of the bracket 12 together with the elastic body 16. A recessed portion 14C that opens onto the forward side in the press-insertion direction (i.e., in the direction shown by the arrow Y) is disposed, for example, at one location in the front portion 14A of the mounting portion 14.

As is shown in FIG. 2 and FIG. 3, the elastic body 16 is, for example, a rubber component that is provided at the mounting component 14, and is press-inserted into the bracket 12 so as to be interposed between the bracket 12 and the mounting portion 14. Specifically, as is shown in FIG. 4, at the front portion 14A of the mounting portion 14, the elastic body 16 covers each one of an end surface 40, an outer wall surface 42, or internal wall surfaces 44 and bottom surface 46 of the recessed portion 14C.

A pair of leg portions 38 that protrude towards the bottom portion 28D of the cylindrical portion 28 of the bracket 12 are provided at the elastic portion 16. The leg portions 38 are each formed so as to protrude diagonally downwards from a bottom portion of the front portion 14A of the mounting portion 14, and are located symmetrically relative to a vertical center line of the mounting portion 14. Bottom ends 38D of each leg portion 38 fit respectively in bottom side corner portions of an inside wall of the cylindrical portion 28. Accordingly, the leg portions 38 are positioned such that, when a static load received from the engine 24 is acting on the elastic body 16 via the mounting portion 14, the legs portions become compressed between the bracket 12 and the mounting portion 14. The press-insertion of the elastic body 16 refers, for example, to inserting the elastic body 16 into the cylindrical portion 28 of the bracket 12 while causing the leg portions 38 to undergo compressive deformation in the up-down direction (i.e., in the direction shown by the arrow F).

Figure 5:
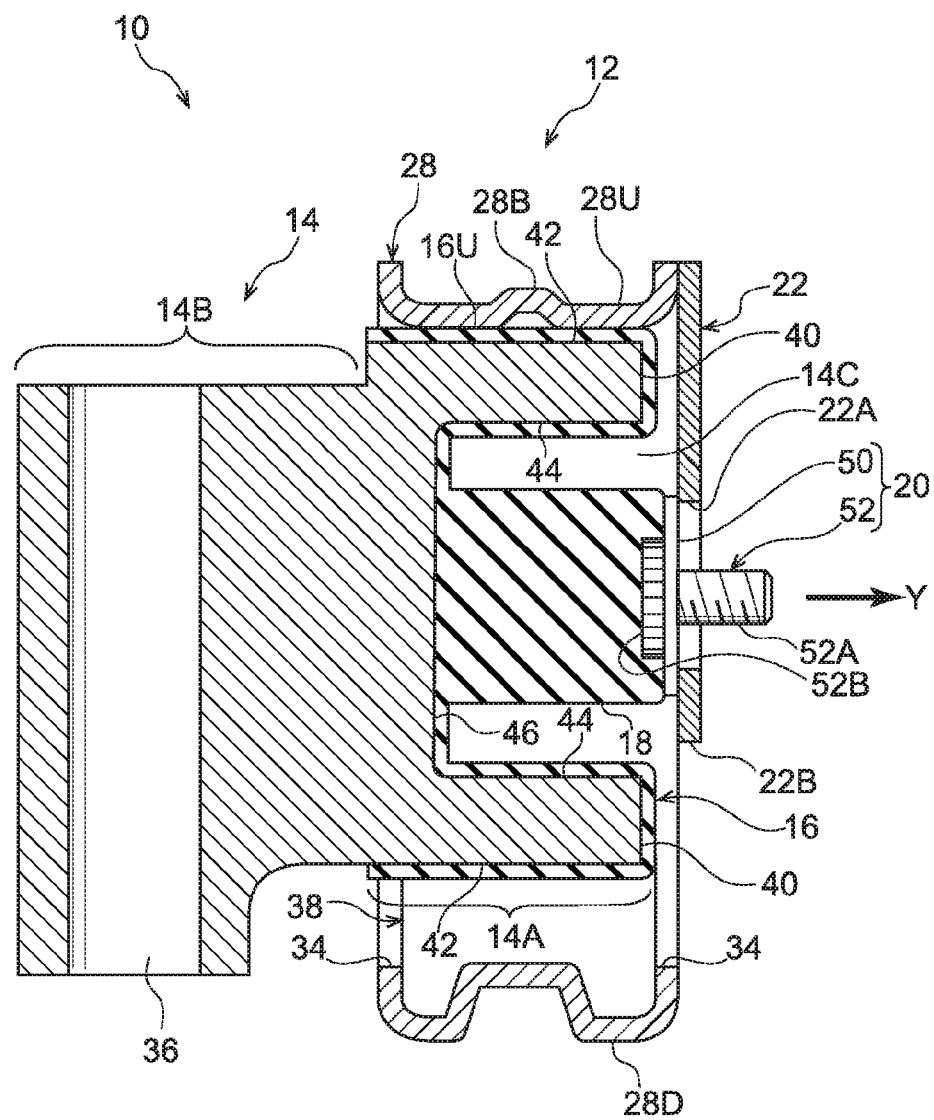
FIG. 5 is a cross-sectional view showing a state in which the elastic body has been press-inserted into the cylindrical portion.

As is shown in FIG. 5 and FIG. 7, an upper portion 16U of the elastic body 16 fits against a ceiling portion (i.e., the bottom surface of an upper portion 28U) of the cylinder portion 28. As is shown in FIG. 3, a gap 48 is provided between a side portion 16S of the elastic body 16 and a side portion 28S of the cylindrical portion 28, however, it is also possible to employ a structure in which this gap 48 is not formed.

In FIG. 2 and FIG. 4, the auxiliary elastic portion 18 is provided at the mounting portion 14. The auxiliary elastic portion 18 has elasticity and extends in the press-insertion direction (i.e., in the direction shown by the arrow Y) of the elastic body 16. The auxiliary elastic portion 18 is disposed inside the recessed portion 14C. The auxiliary elastic portion 18 is formed, for example, in an angular column shape, and is molded integrally with the elastic body 16 at the bottom portion of the recessed portion 14C. The auxiliary elastic portion 18 is separated from the left and right and the top and bottom internal wall surfaces 44 of the recessed portion 14C. As is shown in FIG. 7, distortion is imparted to the auxiliary elastic portion 18 in the opposite direction (i.e., in the direction shown by the arrow U) from the direction in which the static load is acting (i.e. the direction shown by the arrow F) in accordance with the static load received from the engine 24 when the anti-vibration apparatus 10 is being mounted onto the engine 24 and the vehicle body 26. An axial direction of the auxiliary elastic portion 18 is inclined relative to the press insertion portion.

As is shown in FIG. 4, in its natural state prior to being assembled onto the bracket 12, the auxiliary elastic portion 18 protrudes slightly in the press-insertion direction (i.e., in the direction shown by the arrow Y) beyond the elastic body 16 that covers the end surface 40 of the mounting portion 14. However, because the auxiliary elastic portion 18 becomes inclined after it has been mounted onto the bracket 12, both the auxiliary elastic portion 18 and the elastic body 16 are positioned on substantially the same plane (see FIG. 7).

In FIG. 2 and FIG. 7, the connector portion 20 is provided, for example, at a distal end on the front side in the press-insertion direction (i.e., in the direction shown by the arrow Y) of the auxiliary elastic portion 18. This connector portion 20 has a square-shaped plate component 50 that has an equivalent surface area as, for example, the surface area of the aforementioned distal end, and a threaded component 52 that is assembled with the plate component 50. The connector portion 20 is, for example, adhesively bonded to the auxiliary elastic portion 18. The threaded component 52 has a male threaded portion 52A, and a flange-shaped base portion 52B that has a wider diameter than the male threaded portion 52A and is integrally formed with the male threaded portion 52A.

The plate component 50 and the threaded component 52 are engaged with each other by means of serration or the like, so that the threaded component 52 is not able to rotate relatively to the plate component 50. The threaded component 52 penetrates the plate component 50, and protrudes towards the forward side in the press-insertion direction (i.e., in the direction shown by the arrow Y). The base portion 52B of the threaded component 52 is positioned between the plate component 50 and the auxiliary elastic portion 18.

In FIG. 2 and FIG. 7, the connection-receiving portion 22 is provided at the bracket 12 and is the portion to which the connector portion 20 is connected. This connection-receiving portion 22 is, for example, a plate component that is provided, for example, at one end in the axial direction (i.e., the end portion on the forward side in the press-insertion direction (i.e., the direction shown by the arrow Y)) of the cylindrical portion 28 of the bracket 12, and partially blocks off the aperture at this one end. An elongated hole 22A through which the threaded component 52 is inserted, and that is elongated in the up-down direction (i.e., in the opposite direction (i.e., the direction shown by the arrow U) from the direction in which the static load is applied (i.e., the direction shown by the arrow F) in FIG. 7) is formed in the connection-receiving portion 22 in front of the auxiliary elastic portion 18. A rectangular protruding portion 22B is formed in the connection-receiving portion 22 adjacent to a bottom end of the elongated hole 22A. This protruding portion 22B protrudes downwards in the longitudinal direction of the elongated hole 22A (i.e., in the direction in which the static load is applied (i.e., the direction shown by the arrow F) in FIG. 7). Moreover, the protruding portion 22B is formed large enough that it covers the plate component 50 of the connector portion 20, for example, when viewed from the front (see FIG. 3).

Note that, instead of the elongated hole 22A, it is also possible to form a circular hole in the position of the bottom end of the elongated hole 22A. In this case, it is desirable to devise a press-insertion method that enables the male threaded portion 52A of the threaded component 52 to enter the circular hole, such as, for example, deforming the elastic body 16 in the direction shown by the arrow F when press-inserting it into the bracket 12.

(Operation)

The present embodiment has the above-describe structure, and an operation thereof will now be described. In FIG. 7, in the anti-vibration apparatus 10 according to the present embodiment, the auxiliary elastic portion 18 that extends in the press-insertion direction (i.e., the direction shown by the arrow Y) of the elastic body 16 is provided at the mounting portion 14, and the connector portion 20 at the distal end of the auxiliary elastic portion 18 is connected to the connection-receiving portion 22 of the bracket 12. Because of this, it is possible to increase the load capacity in the press-insertion direction (i.e., in the direction shown by the arrow Y) of the elastic body 16 using what is known as an "outer-tubeless structure" that is achieved by assembling the elastic body 16 together with the bracket 12 without using an adhesive. In other words, it is possible to secure the springiness of the elastic body 16 in the axial direction of the cylindrical portion 28 in the bracket 12.

Moreover, because the auxiliary elastic portion 18 is disposed inside the recessed portion 14C of the mounting portion 14, it is possible to suppress any increase in size that might otherwise be caused by providing the auxiliary elastic portion 18, and to improve the space utilization efficiency in the portion where the anti-vibration apparatus 10 is mounted. Because the auxiliary elastic portion 18 is separated from the internal wall surfaces 44 of the recessed portion 14C, when the engine 24 generates a vibration, it is difficult for the auxiliary elastic portion 18 to come into contact with the internal wall surfaces 44 of the recessed portion 14C. As a consequence, the auxiliary elastic portion 18 is able to maintain its spring characteristics in the directions in which the auxiliary elastic portion 18 moves towards or away from the internal wall surface 44 of the recessed portion 14C.

Furthermore, in the anti-vibration apparatus 10, in accordance with the static load received from the engine 24 when the anti-vibration apparatus 10 is being mounted onto the engine 24 and the vehicle body 26, distortion is imparted in the opposite direction (i.e. in the direction shown by the arrow U) from the direction in which this static load is acting (i.e., the direction shown by the arrow F). Accordingly, in a state in which the anti-vibration apparatus 10 is being mounted onto the engine 24 and the vehicle body 26, because the mass (i.e. the static load) of the engine 24 acts on the auxiliary elastic portion 18, the distortion imparted to the auxiliary elastic portion 18 decreases, so that the inclination of the auxiliary elastic portion 18 also lessens. Because of this, when the anti-vibration apparatus 10 is being mounted onto the engine 24 and the vehicle body 26, the auxiliary elastic body 18 can be brought close to a neutral state (i.e., a state in which the initial distortion is 0).

[Method of Manufacturing an Anti-Vibration Apparatus]

A method of manufacturing an anti-vibration apparatus according to the present embodiment has four steps and these are shown in FIG. 4 through FIG. 7.

In FIG. 4 and FIG. 5, the bracket 12 is a component that is mounted onto one of a vibration-generating portion or a vibration-receiving portion (the bracket 12 is mounted onto the vehicle body 26 in FIG. 1). The mounting portion 14 is a component that is mounted onto the other one of the vibration-generating portion or the vibration-receiving portion (the mounting portion 14 is mounted onto the engine 24 in FIG. 1). The elastic body 16 which is interposed between the bracket 12 and the mounting portion 14 is provided at the mounting portion 14.

In a first step, the elastic body 16 is press-inserted (in the direction shown by the arrow Y) into the bracket 12. As a result, the bottom ends 38D of the pair of leg portions 38 fit respectively in bottom side corner portions of the inside wall of the cylindrical portion 28, and the upper portion 16U of the elastic body 16 fits against the ceiling portion (i.e., the bottom surface of the upper portion 28U) of the cylinder portion 28. Moreover, the auxiliary elastic portion 18 that extends in the press-insertion direction of the elastic body 16 is provided at the mounting portion 14, and the connector portion 20 is provided at the auxiliary elastic portion 18. The threaded component 52 of this connector portion 20 is inserted into the elongated hole 22A of the connection-receiving portion 22, and protrudes towards the front in the press-insertion direction (i.e., in the direction shown by the arrow Y). At this time, the threaded component 52 is positioned above the bottom end of the elongated hole 22A, and there is sufficient leeway remaining for the threaded component 52 to move downwards (i.e., in the direction shown by the arrow F).

Figure 6:
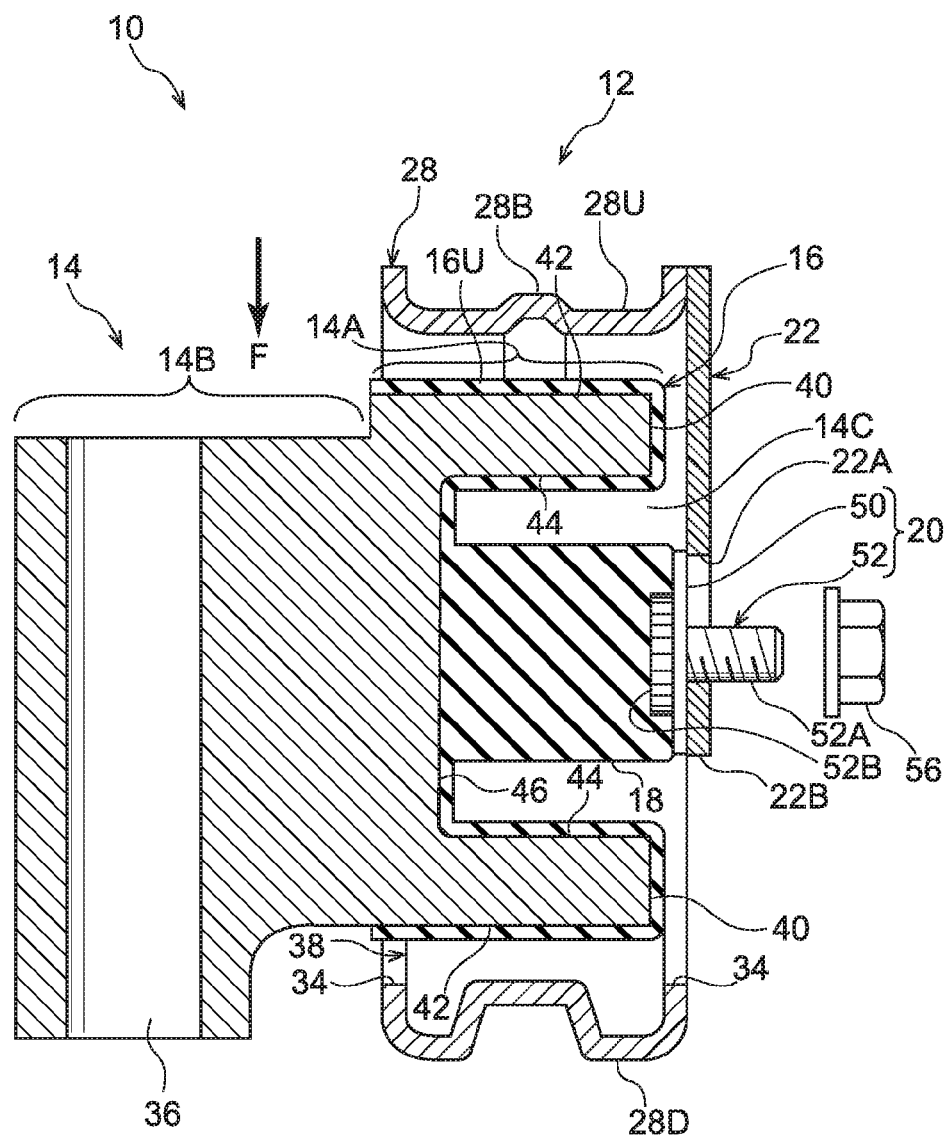
FIG. 6 is a cross-sectional view showing a state in which the elastic body is deformed downwards.

Next, in FIG. 6, in a second step, a static load is applied to the elastic body 16, and the elastic body 16 is placed in a state in which it is deformed in the direction in which the static load is acting (i.e., the direction shown by the arrow F). This static load corresponds to the mass received by the elastic body 16 from the engine 24 when, for example, the anti-vibration apparatus 10 is being mounted onto the engine 24 and the vehicle body 26. At this time, the leg portions 38 of the elastic body 16 undergo elastic deformation, and the mounting portion 14 moves in the direction in which the static load is acting (i.e., in the direction shown by the arrow F). In conjunction with this, the threaded component 52 of the connector portion 20 moves downwards inside the elongated hole 22A of the connection-receiving portion 22.

Next, in a third step, the auxiliary elastic portion 18 that is provided at the mounting portion 14 and extends in the press-insertion direction of the elastic body 16 is connected via the connector portion 20 provided at the auxiliary elastic portion 18 to the connection-receiving portion 22 provided at the bracket 12. Specifically, by screwing a nut 56 onto the threaded component 52 that protrudes from the elongated hole 22A of the connection-receiving portion 22, the connector portion 20 is fastened to the connection-receiving portion 22.

Next, as is shown in FIG. 7, in a fourth step, by removing the static load, the auxiliary elastic portion 18 becomes inclined relative to the press-insertion direction (i.e., the direction shown by the arrow Y), and a distortion is imparted to the auxiliary elastic portion 18 in the opposite direction (i.e. in the direction shown by the arrow U) from the direction in which the static load is acting (i.e., the direction shown by the arrow F). Specifically, if the static load is removed, the compressed leg portions 38 are restored to their natural state, and the mounting portion 14 is displaced in the direction shown by the arrow U. In addition, the upper portion 16U of the elastic body 16 comes into contact with the ceiling portion of the cylindrical portion 28 (i.e., with the bottom surface of the upper surface 28U). Because the distal end of the auxiliary elastic portion 18 is fastened to the connection-receiving portion 22 via the connector portion 20, it does not move, however, the base portion of the auxiliary elastic portion 18 is displaced together with the mounting portion 14 in the direction shown by the arrow U. As a result, the auxiliary elastic portion 18 is placed in a state in which it is inclined, for example, downwards towards the front relative to the press-insertion direction (i.e., the direction shown by the arrow Y).

This inclination decreases as the mass (i.e., the static load) of the engine 24 acts on the mounting portion 14. Accordingly, in this method of manufacturing an anti-vibration apparatus, it is possible to easily manufacture an anti-vibration apparatus 10 that is capable of bringing the auxiliary elastic portion 18 close to a neutral state (i.e., a state in which the initial distortion is 0) when the anti-vibration apparatus 10 is being mounted onto the engine 24 and the vehicle body 26.

Additional Embodiment

In the above-described embodiment, a structure is employed in which the auxiliary elastic portion 18 is provided inside the recessed portion 14C of the mounting portion 14, however, it is also possible to employ a structure in which the auxiliary elastic portion 18 is provided at a different position from the recessed portion 14C. Moreover, it is also possible to employ a structure in which there is no recessed portion 14C. The auxiliary elastic portion 18 may also be formed having an angular column shape, a circular column shape, or a block shape.

Provided that there are no effects on the vibration characteristics of the anti-vibration apparatus 10, then it is also possible to employ a structure in which a portion of the auxiliary elastic portion 18 is in contact with the internal wall surface 44 of the recessed portion 14C.

In the above-described embodiment a structure is employed in which, in accordance with the static load received from the engine 24 (i.e., from the vibration-generating portion), the auxiliary elastic portion 18 imparts distortion in the opposite direction from the direction in which the static load is acting, and the axial direction of the auxiliary elastic portion 18 is inclined relative to the press-insertion direction (i.e. the direction shown by the arrow Y). However, it is also possible to employ a structure in which distortion and inclination of this type are not imparted. Moreover, the structures of the connector portion 20 and the connection-receiving portion 22 are not limited to those described above, and they may be altered as is appropriate. For example, it is also possible to provide a nut on the auxiliary elastic portion 18, and to insert a bolt from the connection-receiving portion 22 side and fasten the nut onto this bolt (not shown).

Examples of embodiments of the present invention have been described and illustrated above, however, embodiments of the present invention are not limited to these examples. Additions, omissions, substitutions, and other modifications may be made insofar as they do not depart from the spirit or scope of the present invention.

Priority is claimed on Japanese Patent Application No. 2014-45414, filed Mar. 7, 2014, the disclosure of which is incorporated herein by reference.

All references, patent applications and technical specifications cited in the present specification are incorporated by reference into the present specification to the same extent as if the individual references, patent applications and technical specifications were specifically and individually recited as being incorporated by reference.

The invention claimed is:

1. An anti-vibration apparatus, comprising:
    a bracket that is mounted at one of a vibration-generating portion or a vibration-receiving portion;
    a mounting portion that is mounted at an other one of the vibration-generating portion or the vibration-receiving portion;
    an elastic body that is provided at the mounting portion and is press-inserted into the bracket, and that is interposed between the bracket and the mounting portion;
    an auxiliary elastic portion that is provided at the mounting portion, and that extends in a press-insertion direction of the elastic body;
    a connector portion that is provided at the auxiliary elastic portion; and
    a connection-receiving portion that is provided at the bracket, and to which the connector portion is connected, wherein
    a recessed portion that opens towards a front side in the press-insertion direction is disposed at the mounting portion, and
    the auxiliary elastic portion is disposed inside the recessed portion.

2. The anti-vibration apparatus according to claim 1, wherein the auxiliary elastic portion is separated from internal wall surfaces of the recessed portion.

3. The anti-vibration apparatus according to claim 1, wherein:
    in accordance with a static load received from the vibration-generating portion when the anti-vibration apparatus is being mounted onto the vibration-generating portion and the vibration-receiving portion, distortion is imparted to the auxiliary elastic portion in an opposite direction from a direction in which the static load is acting, and
    an axial direction of the auxiliary elastic portion is inclined relative to the press-insertion direction.

4. A method of manufacturing an anti-vibration apparatus, the method comprising:
    press-inserting, into a bracket, an elastic body that is provided at a mounting portion and is interposed between the bracket, which is mounted at one of a vibration-generating portion or a vibration-receiving portion, and the mounting portion, which is mounted at an other one of the vibration-generating portion or the vibration-receiving portion;
    applying a static load so as to act on the elastic body, and placing the elastic body in a state in which the elastic body is deformed in a direction in which the static load is acting;
    connecting an auxiliary elastic portion, which is provided at the mounting portion and extends in a press-insertion direction of the elastic body, to a connection-receiving portion that is provided at the bracket, via a connector portion that is provided at the auxiliary elastic portion; and
    by removing the static load, inclining the auxiliary elastic portion relative to the press-insertion direction, and imparting distortion to the auxiliary elastic portion in an opposite direction from the direction in which the static load is acting.

* * * * *